Figure 1:
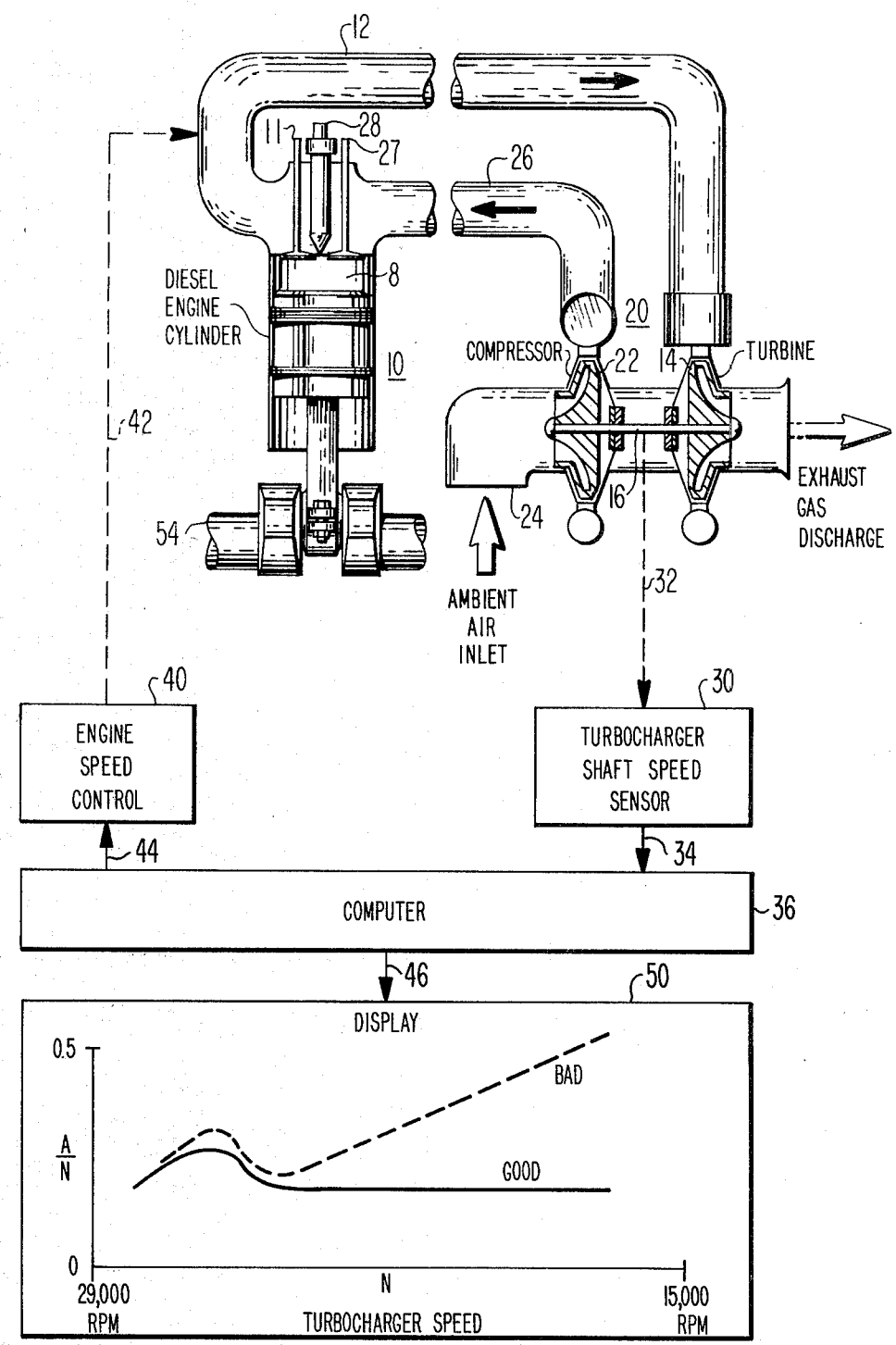

United States Patent [19]

Armstrong

[11] 4,334,427
[45] Jun. 15, 1982

[54] TESTING THE CONDITION OF A TURBOCHARGER

[75] Inventor: Lee R. Armstrong, Newtonville, Mass.

[73] Assignee: RCA Corporation, New York, N.Y.

[21] Appl. No.: 198,457

[22] Filed: Oct. 20, 1980

[51] Int. Cl.³ .......................................... G01M 15/00
[52] U.S. Cl. .................................................. 73/118
[58] Field of Search ....................... 73/116, 118, 117.3

[56] References Cited

U.S. PATENT DOCUMENTS 4,046,003 9/1977 Armstrong et al. ................... 73/118
4,277,830 7/1981 Reid et al. ......................... 73/116 X Primary Examiner—Jerry W. Myracle Attorney, Agent, or Firm—Samuel Cohen; Raymond E. Smiley

[57] ABSTRACT

The method of testing the condition of a turbocharger in a turbocharged internal combustion engine by the steps of allowing the engine to decelerate from a high idle speed to a low idle speed, measuring the speed of the turbocharger shaft as the engine decelerates, determining the slope of the D/N vs. N characteristic, where N is the turbocharger shaft speed and D/N is the absolute value of the turbocharger acceleration divided by turbocharger shaft speed, and comparing the computed slope with a predetermined nearly zero slope of a normal turbocharger to see whether the turbocharger is bad due to excessive sliding friction.

2 Claims, 5 Drawing Figures

TESTING THE CONDITION OF A TURBOCHARGER

The invention relates to the testing of the condition of a turbocharger which is an operating part of an internal combustion engine.

There is an increasing use of turbochargers on internal combustion engines, particularly diesel engines, to increase their power and efficiency. A turbocharger includes a turbine driven by exhaust gases from the engine, and an air compressor driven by the turbine to compress ambient air supplied to the engine. The turbine and compressor are on a common shaft having a rotational speed representing a balance between the drive produced by exhaust gases in the turbine, and the load produced by the air compressor, and also friction in the turbine and the compressor.

When a turbocharger starts to fail, due to deterioration of a bearing, the presence of a foreign object, a bent blade, or a warped heat shield, etc, the friction in the turbocharger increases, and the speed of the turbocharger shaft decreases. However, the impending failure of the turbocharger cannot be detected by merely measuring the speed of the turbocharger shaft because the actual speed varies so much due to changes in exhaust gas pressure and temperature and changes in load caused by the air compressor. It is important to be able to detect a deterioration of a turbocharger before its failure has a catastrophic effect on the engine. This can result, for example, if the turbocharger compressor rotor disintegrates into small pieces which are ingested into the cylinders of the engine.

In accordance with an example of the invention, the condition of a turbocharger on an engine is tested by sensing the speed N of the turbocharger while the engine is coasting down from a high idle speed to a low idle speed, computing the deceleration D divided by speed N, and determining the condition of the turbocharger from the slope of the D/N curve during an intermediate speed range between high idle and low idle.

In the drawing:

FIG. 1 is a diagram of a portion of a diesel engine including a turbocharger, and test equipment connected thereto for determining the condition of the turbocharger; and FIGS. 2 through 5 are charts which will be referred to in describing the operation of the apparatus of FIG. 1.

In FIG. 1, the exhaust gases from the cylinder 8 of a diesel engine 10 are conveyed past an exhaust valve 11 and via a pipe 12 to a turbine motor 14 on a shaft 16 in a turbocharger 20. Rotation of the turbine 14 by the exhaust gases acts through shaft 16 to drive air compressor 22. This causes ambient air at inlet 24 to be compressed and delivered via pipe 26 and through an inlet valve 27 to the interior of the cylinder 8. Diesel fuel is supplied to the cylinder via a fuel injector 28. The test equipment by which the condition of turbocharger 20 is determined includes a turbocharger shaft speed sensor 30 having a mechanical linkage over path 32 with the shaft 16, and having a speed-indicating electrical signal output at 34. The shaft speed sensor 30 may be a tachometer mechanically connected to the shaft 16 if the shaft is externally accessible, or may include an electro-magnetic pick-up constructed in the turbocharger, or may include an electro-magnetic pick-up device positioned on the exterior of the turbine 14 or the compressor 22 to sense the movement of rotor blades therein. In any case, the electrical signal representing the rotational speed of shaft 16 is supplied over line 34 to a computer 36.

The speed of operation of the diesel engine 10 is controlled by an engine speed control unit 40 acting over a mechanical linkage 42 on the fuel injector 28. The unit 40 is controlled, in turn, by an electrical signal supplied over line 44 from computer 36. The engine speed control 40 may be a human operator acting on information supplied by computer 36.

The computer 36, as will be described, operates through engine speed control unit 40 to accelerate and then decelerate the diesel engine 10, and during the deceleration of the engine, receives turbocharger shaft speed information from sensor 30. The computer analyses the turbocharger shaft speed information and supplies a turbocharger condition signal over path 46 to a display device 50, which may be a cathode-ray-tube display unit. The display device, depending on the type selected, may display a characteristic as shown, or may display a number representing the slope of the D/N vs N characteristic, or simply the word "GOOD" or the word "BAD".

The turbocharger condition test is based on an analysis of the deceleration of the turbocharger shaft after the engine is turned off, rather than on any single shaft speed reading. Because the turbocharger speed tends to "float", to arrive at a balance between power produced by the turbine and power absorbed by the compressor and friction, steady-state speed measurements are of little value. It is possible for the turbocharger to have faults, yet still reach an acceptable steady-state speed. Likewise, minor variations in engine (and accessory) condition can cause large variations in steady-state turbocharger speed. It is the transient performance of the turbocharger which provides the most reliable indication of its performance and condition.

Figure 4:
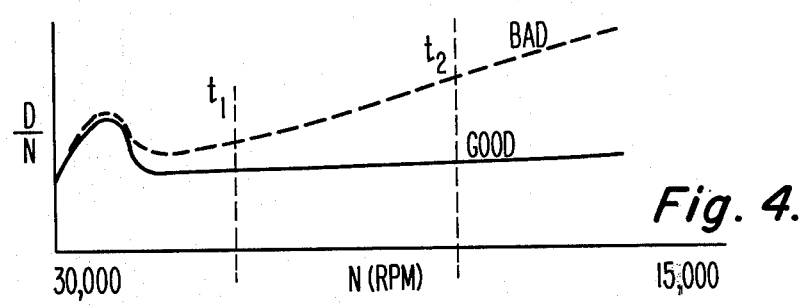

During an acceleration from idle to high idle, the predominant factor determining turbocharger acceleration is the power produced by the turbine (directly related to the available energy in the exhaust). During deceleration of the engine from high idle, the fuel is shut off and the turbine power is negligible, with the compressor load and friction predominating. The compressor pressure ratio is close to 1, and the power absorbed is minimal. Allowing for some error to be introduced during certain phases of operation, the compressor power can be ignored. With these assumptions, the deceleration force on the turbocharger is considered to be solely due to friction. For a normal turbocharger, the friction is almost entirely due to viscous friction in the bearings. The complete analysis of real journal bearing friction can become quite complex; it is sufficient here to simplify the analysis to the following relationship:

$$F_v = K_1 \mu N \tag{1}$$

where
$F_v$ = viscous frictional force
$K_1$ = constant determined by bearing geometry
$\mu$ = viscosity of fluid
$N$ = turbocharger shaft speed in which it is apparent that the friction, and therefore the retarding torque due to viscous friction, is directly proportional to the oil viscosity and turbocharger speed. All of the anticipated failure modes involve bearing failure, or some other form of metal to metal contact which is a form of sliding friction. Sliding friction, however, is independent of speed. Thus, there are two types of retarding force acting on the faulted turbocharger—one which is constant and one which is proportional to speed. Since $$D = K_2 F \qquad (2)$$

where
D = deceleration (or acceleration)
$K_2$ = constant determined by inertia and torque moment arm
F = total retarding force
and the retarding force is composed of two components, $F_v$ from viscous friction and $F_s$ from sliding friction, $$D = K_2(F_v + F_s) = K_2 F_v + K_2 F_s \qquad (3)$$

and by substitution of equation 1, $$D = K_3 \mu N + K_2 F_s \qquad (4)$$

for a normal (good) turbocharger, $F_s = 0$ and $$D/N = K_3 \mu \qquad (5)$$

in which D/N should be directly proportional to the engine oil viscosity. FIG. 4 shows D/N values for a good turbocharger and a bad one. As can be seen, there is an initial peak in D/N which then decreases to a steady value, independent of speed and proportional to oil viscosity (determined by engine temperature). The initial non-linearity and peaking of D/N is due to compressor loading. When the fuel is first shut off at high idle, the turbocharger compressor will have a positive pressure ratio and be absorbing some power. This results in the previously mentioned error caused by assuming compressor power to be negligible. As the turbocharger slows down, the pressure ratio rapidly drops to near one and the compressor power drops to near zero.

For a bad turbocharger, $F_s$ is not equal to zero, and $$D/N = K_3 \mu + K F_s / N \qquad (6)$$

Thus, D/N should increase with decreasing engine speed, as shown by the dashed curve in FIG. 4. The slope of D/N between points $t_1$ and $t_2$ is then a measure of turbocharger condition (amount of sliding friction). It is apparent that by using the slope instead of the absolute value of D/N, the results are not affected by oil viscosity, a concern when testing a large variety of engines in different operating conditions (oil type and temperature).

Figure 2:
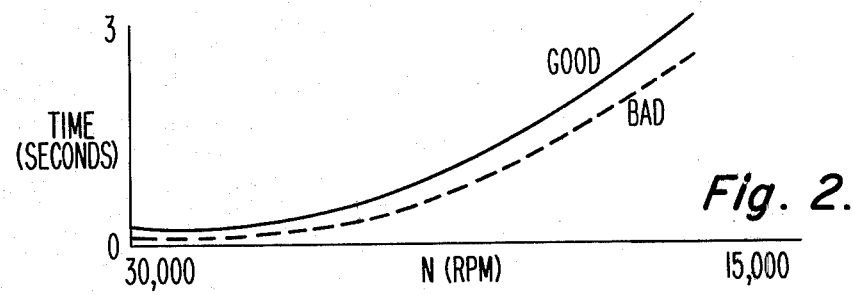

In the operation of the apparatus of FIG. 1, a turbocharger test is initiated by causing the engine 10 to accelerate to a high idle speed and then decelerate to a low idle speed. This may be accomplished by a signal from the computer 36 acting through the engine speed control unit 40 on the fuel injector 28 of the engine. As the engine decelerates, the turbocharger shaft also decelerates from a speed N such as 30,000 rpm to a speed N such as 15,000 rpm, as shown by the chart of FIG. 2. The speed of a "bad" turbocharger decreases more quickly than the speed of a "good" turbocharger because of the higher sliding friction in the "bad" turbocharger.

Figure 3:
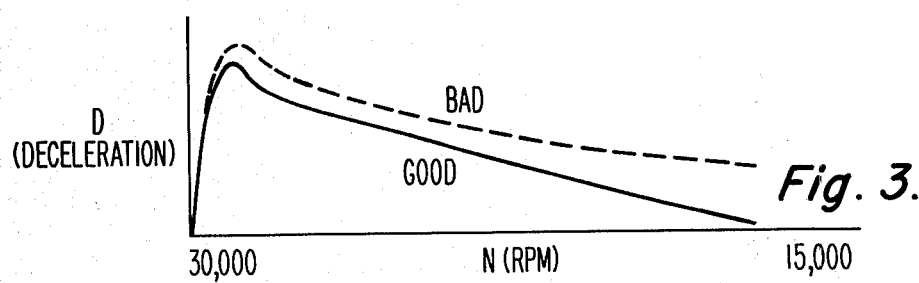

The decreasing speed of the turbocharger shaft is continuously sensed by the turbocharger shaft speed sensor 30, and electrical sample representations of the decreasing speed are supplied over line 34 to the computer 36. The computer uses each speed information sample (together with the previous speed sample) to calculate the deceleration D between samples as shown by the chart of FIG. 3, and uses the resultant value of D together with the speed sample N to calculate D/N as shown by the chart of FIG. 4, and finally uses the resultant value of D/N and the speed sample N to calculate the slope of D/N, particularly in the intermediate region between times $t_1$ and $t_2$.

The difference between a good turbocharger and a bad one is apparent in FIG. 4 where the D/N vs. N characteristic for a good supercharger shows the D/N is substantially constant with decreasing shaft speed indicating that the sliding friction $F_s$ is zero.

Figure 5:
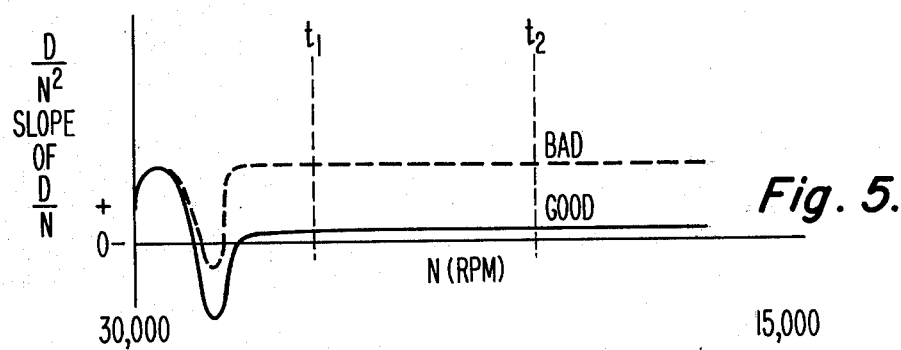

The difference between a good turbocharger and a bad one is even more apparent in quantitative terms in FIG. 5, where the slope of the D/N curve in FIG. 4 is plotted and shows that a good turbocharger has a D/N slope in the intermediate region $t_1$–$t_2$ which is substantially zero, while a bad turbocharger has a significantly higher slope. A go-no go threshold value for the absolute value of the D/N slope can be set to conveniently and positively distinguish good and bad turbochargers.

What is claimed is:
1. The method of testing the condition of a turbocharger in a turbocharged internal combustion engine, comprising the steps of:
 operating the engine at a high idle speed,
 shutting off the fuel to the engine and allowing the engine and turbocharger to decelerate,
 measuring the speed of the turbocharger as it decelerates,
 determining the D/N vs. N characteristic, where N is the turbocharger shaft speed and D/N is the absolute value of the turbocharger deceleration divided by turbocharger shaft speed, and
 comparing the slope of the D/N vs. N characteristic with a nearly zero slope of a normal turbocharger to see whether there is an excessive slope due to sliding friction in the turbocharger.
2. The method of testing the condition of a turbocharger in a turbocharged internal combustion engine, comprising the steps of:
 operating the engine at a high idle speed,
 shutting off the fuel to the engine and allowing the engine and turbocharger to decelerate,
 measuring the speed of the turbocharger as it decelerates,
 determining the slope of the D/N vs N characteristic, where N is the turbocharger shaft speed and D/N is the absolute value of the turbocharger deceleration divided by turbocharger shaft speed, and
 comparing said computed slope with a predetermined nearly zero slope of a normal turbocharger to see whether there is an excessive slope due to sliding friction in the turbocharger.

* * * * *